No. 635,860. Patented Oct. 31, 1899.
A. LATHAM.
CASH REGISTER.
(Application filed Dec. 8, 1897.)
(No Model.) 7 Sheets—Sheet 1.

WITNESSES

INVENTOR
Albert Latham,
by George H. Huntington
Attorney

No. 635,860. Patented Oct. 31, 1899.
A. LATHAM.
CASH REGISTER.
(Application filed Dec. 8, 1897.)
(No Model.) 7 Sheets—Sheet 2.

WITNESSES

INVENTOR
Albert Latham,
by George H. Huntington
Attorney

No. 635,860.  
A. LATHAM.  
CASH REGISTER.  
(Application filed Dec. 8, 1897.)  
(No Model.)

Patented Oct. 31, 1899.

7 Sheets—Sheet 3.

WITNESSES

INVENTOR  
Albert Latham,  
by George H. Huntington  
Attorney

No. 635,860. Patented Oct. 31, 1899.
A. LATHAM.
CASH REGISTER.
(Application filed Dec. 8, 1897.)
(No Model.) 7 Sheets—Sheet 4.
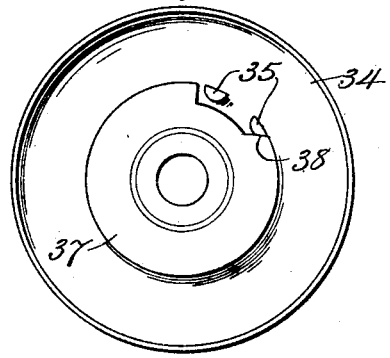
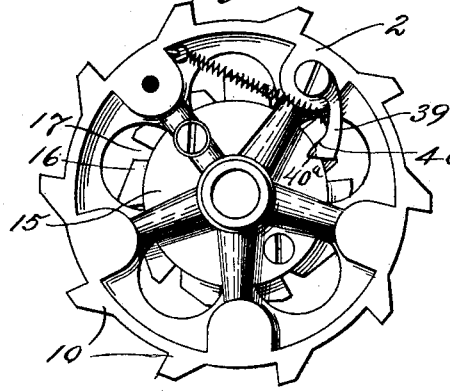 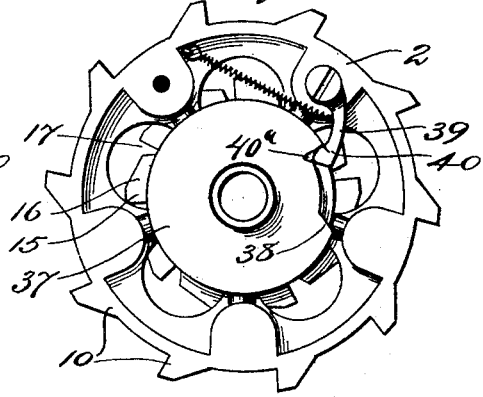
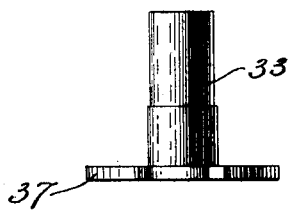
WITNESSES
INVENTOR
Albert Latham,
by George H. Huntington
Attorney No. 635,860. Patented Oct. 31, 1899.
A. LATHAM.
CASH REGISTER.
(Application filed Dec. 8, 1897.)
(No Model.) 7 Sheets—Sheet 5.
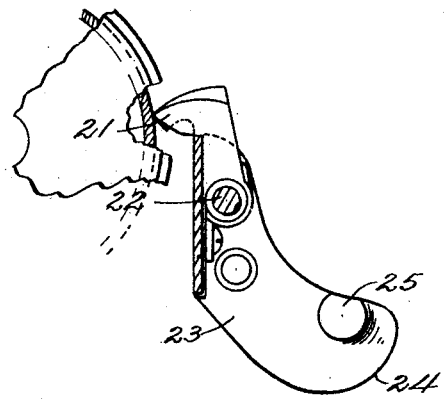
Fig. 11.
Fig. 12.
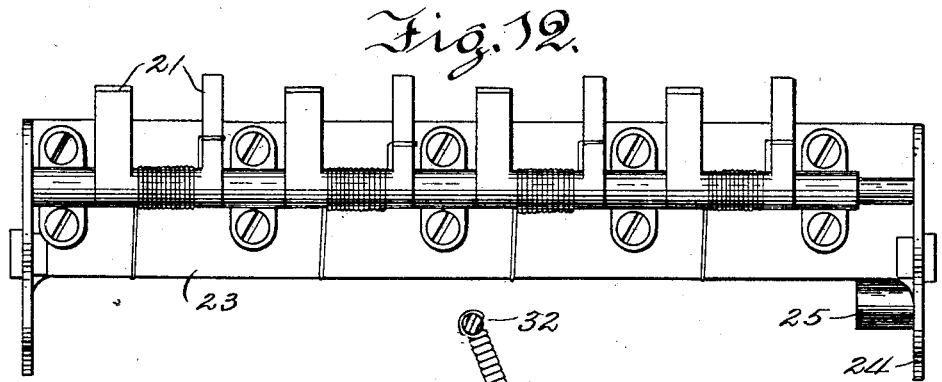
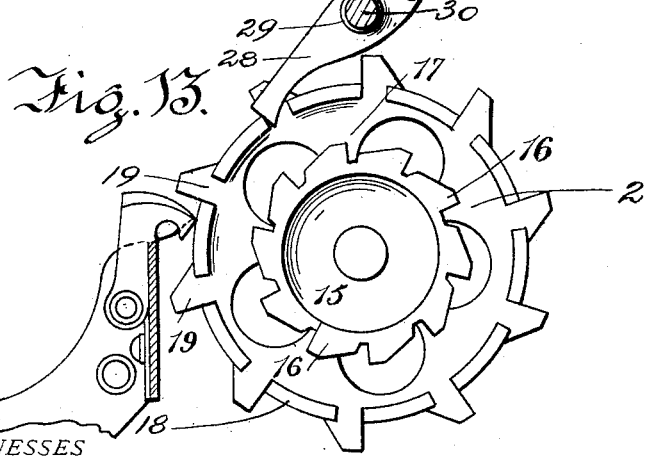
Fig. 13.
WITNESSES
INVENTOR
Albert Latham,
By George H. Huntington
Attorney No. 635,860. Patented Oct. 31, 1899.
A. LATHAM.
CASH REGISTER.
(Application filed Dec. 8, 1897.)
(No Model.) 7 Sheets—Sheet 6.
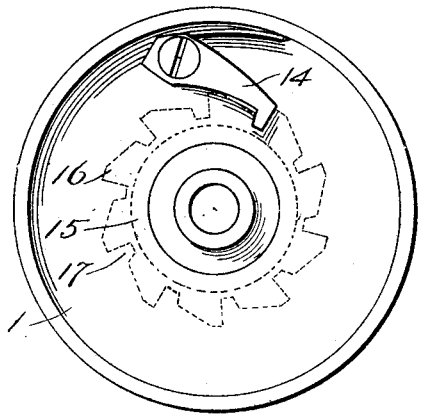
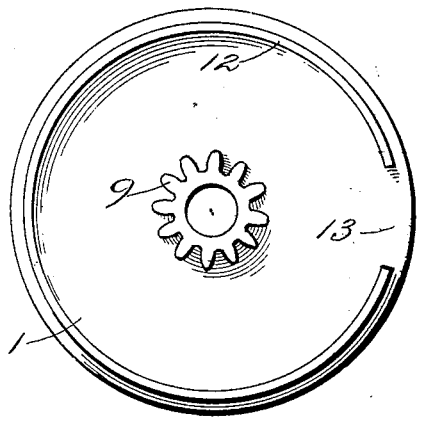
WITNESSES
INVENTOR
Albert Latham,
by George N. Huntington
Attorney No. 635,860. Patented Oct. 31, 1899.
A. LATHAM.
CASH REGISTER.
(Application filed Dec. 8, 1897.)
(No Model.) 7 Sheets—Sheet 7.

WITNESSES: INVENTOR
Albert Latham,
BY
Geo. H. Huntington,
ATTORNEY.

UNITED STATES PATENT OFFICE.

ALBERT LATHAM, OF SPRINGFIELD, MASSACHUSETTS.

CASH-REGISTER.

SPECIFICATION forming part of Letters Patent No. 635,860, dated October 31, 1899.

Application filed December 8, 1897. Serial No. 661,192. (No model.)

*To all whom it may concern:*

Be it known that I, ALBERT LATHAM, of the city of Springfield, county of Hampden, and State of Massachusetts, have invented a new and useful Improvement in Cash-Registers, of which the following is a specification.

My invention relates to cash-registers of the class in which registration is effected by means of a series of rotary indicators; and the invention has reference particularly to the construction of and means for operating said indicators.

The invention consists generally in the improved cash-register of the class above referred to and in the combination and arrangement of the various parts thereof and specially in peculiar mechanism for operatively connecting its indicators, in means for controlling the movements of said indicators, and in a special wheel, which I term a "totalizing-wheel" and which constitutes one of said indicators.

Figure 1:
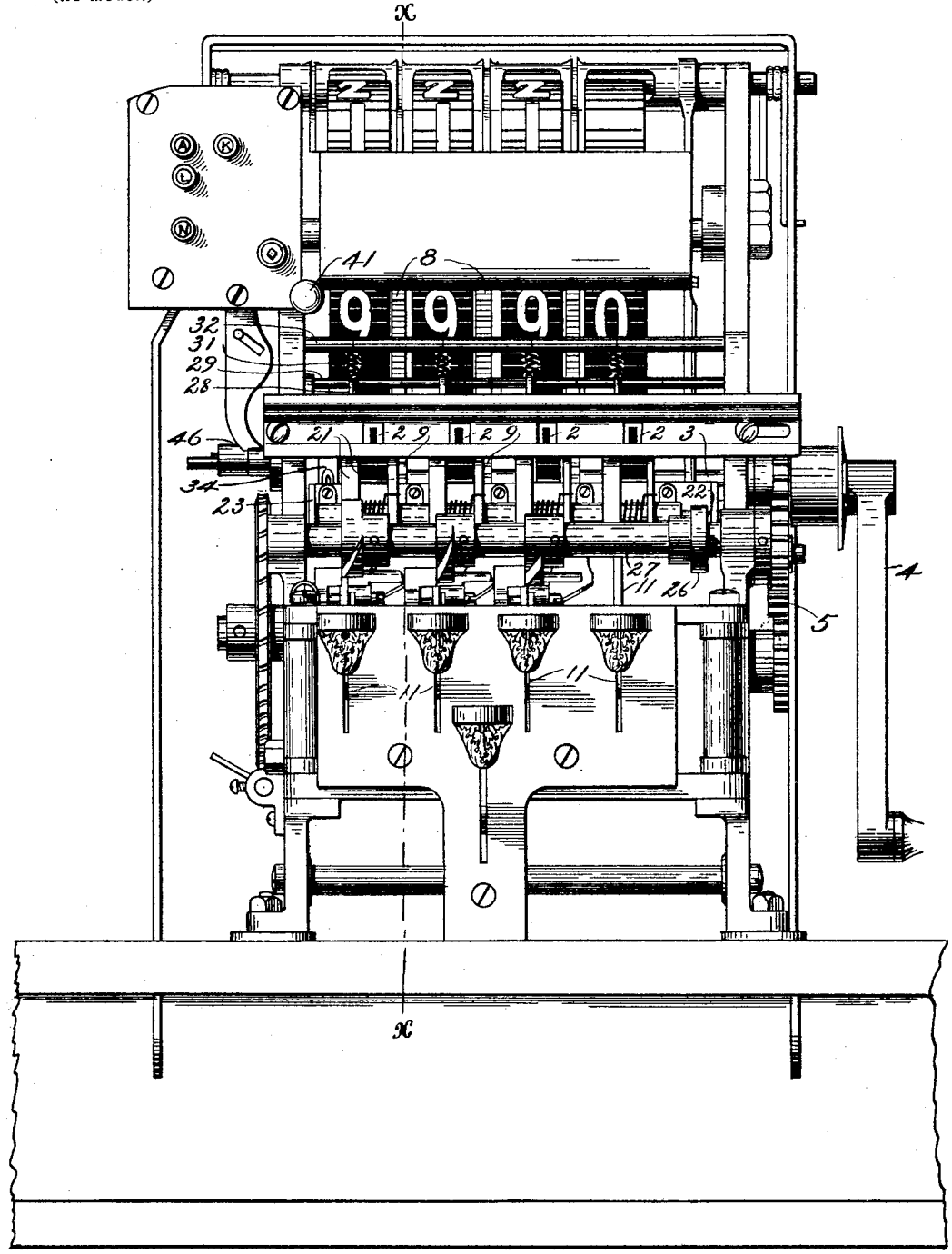
Figure 2:
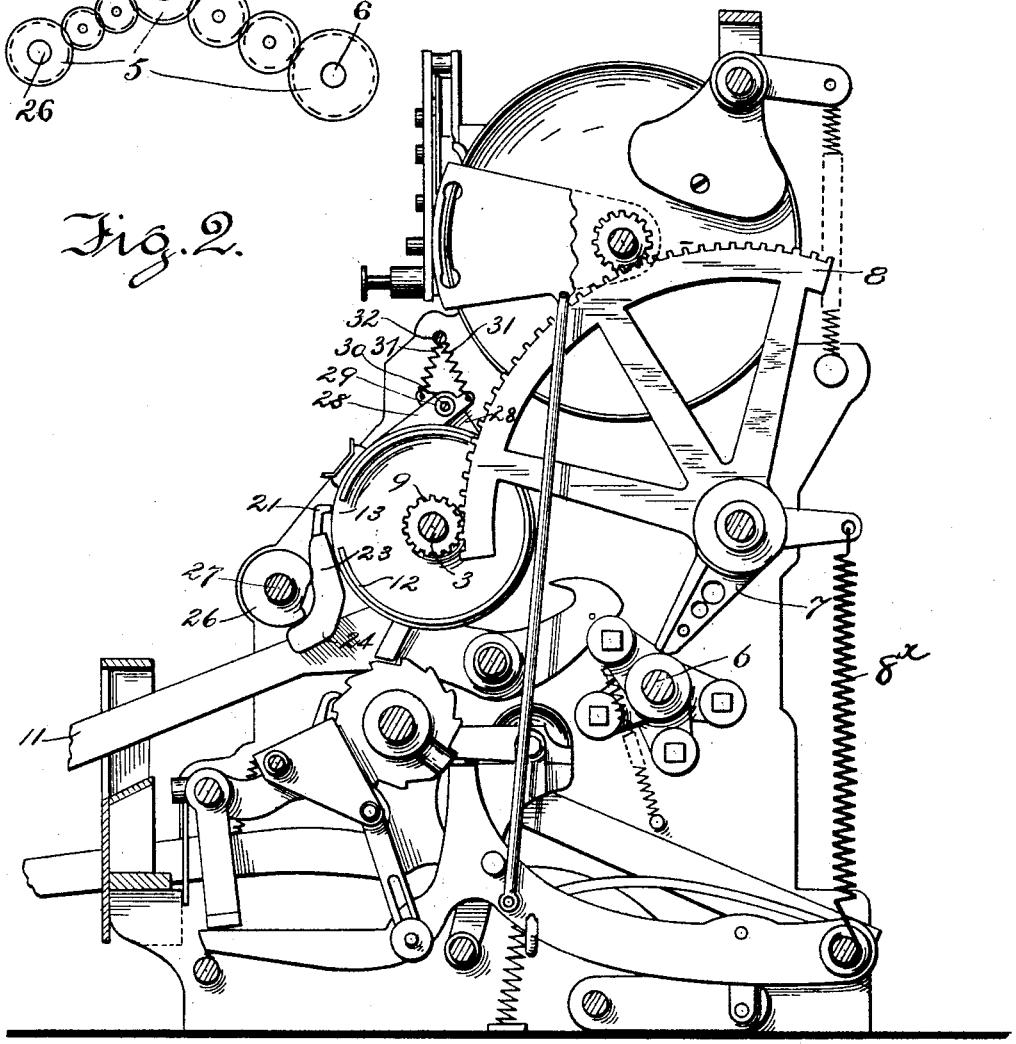
Figure 3:
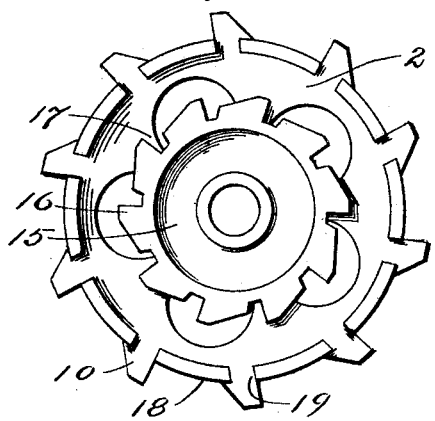
Figure 4:
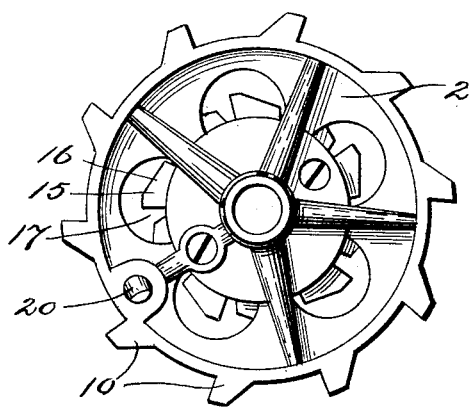
Figure 5:
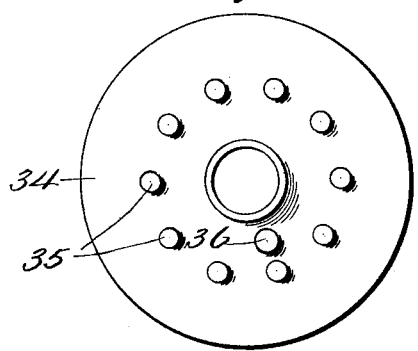
Figure 6:
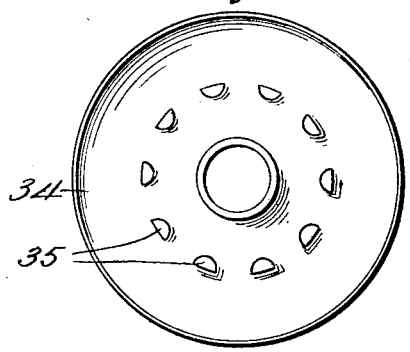
Figure 16:
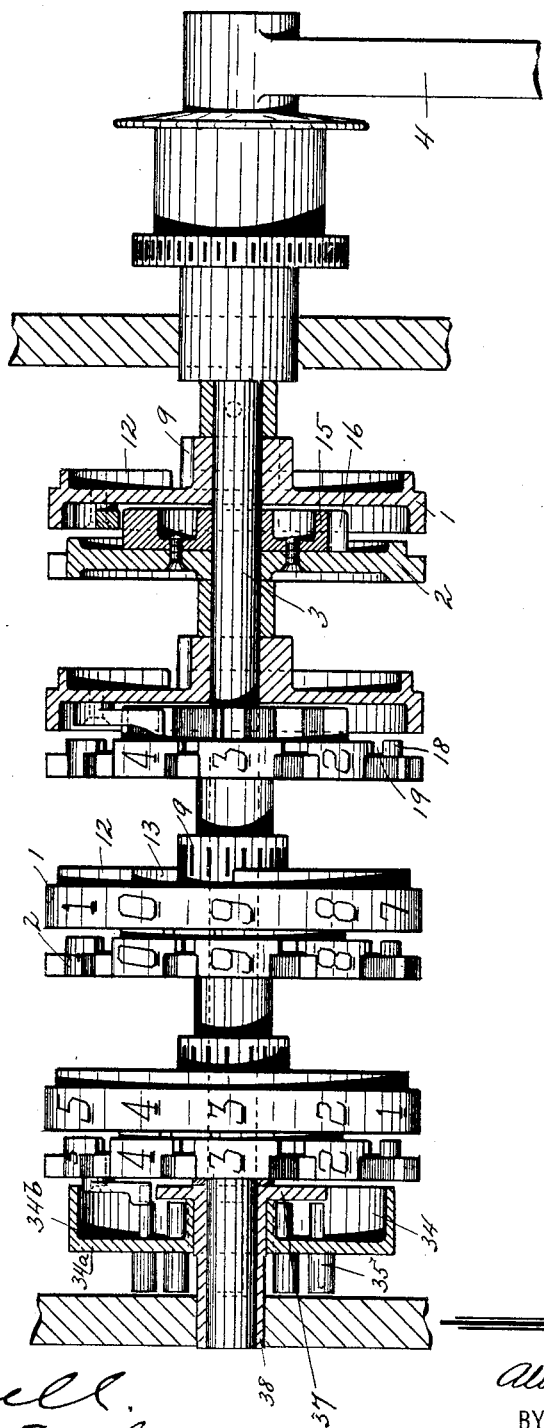

In the accompanying drawings, Figure 1 is a front elevation of a cash-register of the kind referred to and provided with my improvements. Fig. 2 is a sectional view on the line $xx$ of Fig. 1. Fig. 2$^a$ is a view showing the arrangement of gearing whereby certain shafts of the machine are connected. Figs. 3 and 4 are side views of one of the adding-wheels. Figs. 5 and 6 are side views of a wheel which I term the "totalizing-wheel." Figs. 7, 8, and 9 are side views of the totalizing-wheel and the adding-wheel of highest order, showing means for throwing said wheels into and out of engagement with each other. Fig. 10 is a side view of a cam which admits the engagement and also causes the disengagement of said wheels. Fig. 11 is a sectional view of a pawl-frame, showing pawls for limiting the rotation of the indicating and adding wheels when the former have completed a rotation. Fig. 12 is a front elevation of said pawl-frame. Fig. 13 shows one of the adding-wheels and one of a series of special pawls whereby backward rotation of said adding-wheels is prevented. Figs. 14 and 15 are side views of one of the indicating-wheels; and Fig. 16 is a view, partially in section and partially in front elevation, of that portion of the machine which includes the main shaft 3 and the series of adding and indicating wheels mounted thereon.

In said drawings, 1 and 2 are indicating and adding wheels, respectively, having numerals ranging from "0" to "9" on their peripheries and being revolubly and independently mounted in pairs, comprising one of each of the kinds of wheels referred to, upon a single shaft 3, operated by a crank 4, carried, preferably, at the right-hand end thereof. The wheels in each pair are adapted to rotate in a forward direction synchronously, being locked together, as hereinafter described. The spring-actuated key-levers 11 have pallets on their rear ends and, being fulcrumed on a common shaft beneath the pairs of wheels, are adapted to engage in such a way with ratchet-teeth 10, arranged alternately with the numerals on the peripheries of the adding-wheels, as to permit an escapement of said wheels upon each actuation of the key-levers in a manner similar to that effected by the analogous construction shown and described in Letters Patent Nos. 597,504 and 597,505, granted to me January 18, 1898.

Through a suitable system of gearing 5, arranged on the side piece of the frame, a cam-shaft 6 is adapted to engage downwardly-projecting arms 7 of segments 8, controlled by springs 8$^\times$, tending to force them upwardly, that are provided with peripheral gear-teeth engaging pinions 9, rigidly secured to the outer or exposed faces of the indicating-wheels. By this means when a desired amount has been indicated and registered said indicating-wheels may be reset to the zero position. When said wheels are reset, they are prevented from forward rotation by the adding-wheels, with which they are interlocked and which are dependent on the movement of their key-levers for their release.

Preliminarily to describing the construction of the adding and indicating wheels it may be advisable to state that, as in all machines of this kind, the former move continuously forward, whereas the latter when necessary are adapted to be returned by the means which have been just briefly described. The function of the adding-wheels therefore is to collectively register the sum total that has been presented by the indicating-wheels.

To those familiar with this class of machines it will be recognized that some means for carrying over the tens from one adding-wheel to the next one of higher order is usually provided. I shall not, however, herein particularly refer to such a mechanism, as it has no direct relation to the mechanism constituting the subject-matter of this application and can be passed over with the mere suggestion that it is considered by those who are familiar with the art very desirable in order to render the machine as thoroughly automatic in its action as is possible.

On the face of each indicating-wheel on which is secured the pinion above referred to and near the edge of the wheel is an annular flange 12, having an elongated opening or notch 13. Pivoted near the rim on the other face of the wheel and set below the edge of said rim is a spring-actuated pawl 14, having a point which projects substantially at right angles to the length of said pawl and in the direction of the center of the wheel. (See Fig. 14.)

Each adding-wheel is provided on the face thereof adjacent to the indicating-wheel with a small ratchet-wheel 15, integrally, or at least rigidly, formed with the adding-wheel and having teeth 16, which are adapted to be engaged by the pawl carried by the indicating-wheel, as clearly indicated in dotted lines in Fig. 15. The teeth of the ratchet-wheel correspond in number, but are disposed reversely to those on the adding-wheel, to which said ratchet-wheel is connected, and are spaced from one another. Between each pair of teeth a notch 17 is formed, in which the point of the pawl 14 is adapted to closely fit. By the arrangement just referred to the independent backward rotation of the wheel carrying the pawl may be effected if sufficient force is applied to drag the pawl-point out of the notch 17; but independent forward movement of the same wheel cannot be effected without synchronously moving therewith the wheel carrying the ratchet-wheel 15. The principal reason for this arrangement is to prevent any play between the adding and indicating wheel of each pair. On the side of each adding-wheel on which said ratchet-wheel 15 is arranged is an annular flange 18, similar to that on each indicating-wheel, but having ten notches 19 instead of one, said notches being arranged in corresponding relation with the teeth of the periphery of said wheel. On its outer face said wheel carries a pin 20, by which the transfer mechanism between each pair of adding-wheels, as above mentioned as being very desirable to a machine of this character, but as not being described or claimed herein, is thrown into operative position.

To lock the pairs of wheels against rotation in either direction when the indicating-wheels have reached their highest numerals, I have provided a series of spring-actuated pawls 21, integrally formed in pairs and carried on a shaft 22 in a spring-actuated frame 23. At its right-hand end said frame is provided with a downwardly-projecting arm or lever 24, which has a lug 25 on its inner face, adapted to be engaged by a cam 26, arranged on a shaft 27, which receives rotation from the main shaft of the machine by a suitable system of gearing, so as to move the frame backward and forward to and from the indicating and adding wheels.

In the normal position of parts the pawl-frame is in contiguity to the wheels, the pawl thereof for each indicating-wheel merely wiping on the flange 12 of said indicating-wheel, and thus preventing its mate from entering one of the ten notches in the flange of the adding-wheel. When the indicating-wheel has reached its highest numbers, however, the corresponding pair of pawls enters the notch 13 of the flange of said indicating-wheel and one of the notches 19 in the flange of the adjoining adding-wheel and prevents further rotation of said wheels. The frame carrying the pawl is drawn backward away from contiguity with the wheels at the beginning of the rotation of the main shaft in the operation of resetting the machine, and the completion of the resetting operation leaves the frame in its initial contiguity to the wheels. The pawls can only be disengaged from said wheels when the machine is reset.

To prevent backward rotation of the adding-wheels when the indicating-wheels are reset to the zero position, I provide a series of spring-pressed auxiliary pawls 28, integrally formed with sleeves 29, arranged on a rod 30, connecting the side pieces of the frame above the wheels. Said pawls 28 engage the notches 19 in the flanges of the adding-wheels.

Adjacent to the adding-wheel of highest order and journaled upon a short tubulure 33, that is penetrated by the main shaft and projects through the side piece of the frame, is a wheel 34, which I term a "totalizing-wheel" and which is provided with numerals corresponding to those on the indicating and adding wheels. Its function is that of an adding-wheel, and it is operatively connected with the highest adding-wheel, so as to be automatically operated thereby, but by mechanism different from that which connects the adding-wheels. The totalizing-wheel consists of a disk 34$^a$, having a peripheral flange 34$^b$, projecting in the direction of the adding-wheel and upon which the numerals are arranged. Through said disk extend at equal distances ten pins 35, said pins projecting from the face of the disk which is the nearer to the adjoining adding-wheel and each having the longitudinal outer half of its projecting end removed or cut away.

At the inner end of the tubulure and integrally formed therewith is a disk 37, having an elongated notch formed in its edge, one end of which is inclined, as shown at 38. A spring-actuated pawl 39, carried upon the face of the adding-wheel which is adjacent to said disk, is provided at its free end with a rounded portion or cam 40, which rides or wipes on the periphery of the disk, and an angular portion or point 40ª, situated alongside of said cam. The angular portion or point of the pawl is adapted to engage in each of the rotations of the adding-wheel the one of the pins 35 which is uncovered by the notch in said disk and to be disengaged therefrom when the point of the pawl has pushed the totalizing-wheel by means of said pin to such a position with the pin opposite to the inclined edge of the notch that said pawl-point will be thrown out of contact with the pin by the inclined edge. The cam is adapted to facilitate the disengagement of the pawl-point from the pin.

Having thus fully described my invention, what I claim, and desire to secure by Letters Patent of the United States, is—

1. In a cash-register, the combination of an indicating-wheel provided near its periphery with a notch an adding-wheel provided with a series of similarly-situated notches, a pair of integrally-formed pawls adapted to enter the notch on the indicating-wheel and a coincident notch on the adding-wheel, and means for synchronously operating said wheels, substantially as described.

2. In a cash-register, the combination of indicating-wheels each provided near its periphery with a notch, adding-wheels arranged in alternate relation with said indicating-wheels and each provided with a series of similarly-situated and equidistantly-disposed notches, means for synchronously operating said wheels in pairs comprising one of each kind thereof, a reciprocating pawl-frame pivoted near said wheels, and pairs of integrally-formed spring-pressed pawls carried by said pawl-frame and adapted to enter the notch on each indicating-wheel and a coincident notch on each adding-wheel, substantially as described.

3. In a cash-register, the combination of indicating-wheels each provided near its periphery with a notch, adding-wheels arranged in alternate relation with said indicating-wheels and each provided with a series of similarly-situated and equidistantly-disposed notches, means for synchronously operating said wheels in pairs comprising one of each kind thereof, a reciprocating pawl-frame pivoted near said wheels, pairs of integrally-formed spring-pressed pawls carried by said pawl-frame and adapted to enter the notch on each indicating-wheel and a coincident notch on each adding-wheel, and means for withdrawing said frame so as to disengage said pawls from the wheels, substantially as described.

4. In a cash-register, the combination with the frame, of a main shaft revolubly mounted in said frame and provided with suitable operating means, pairs of wheels each comprising an indicating and an adding wheel revolubly mounted on said shaft, the indicating-wheels each having a notch, and the adding-wheels each having a series of notches, arranged near its periphery, means for operating said pairs of wheels in a forward direction synchronously, a suitable train of mechanism between the indicating-wheels and said shaft for revolving said indicating-wheels in a rearward direction by means of said shaft and thereby resetting said wheels, a reciprocating pawl-frame pivoted near said wheels, pairs of integrally-formed spring-actuated pawls carried by said pawl-frame and adapted to enter the notch on each indicating-wheel and a coincident notch on each adding-wheel, and a cam-shaft operatively connected to said main shaft and adapted to reciprocate the pawl-frame when the indicating-wheels are reset, substantially as described.

5. In a cash-register, the combination with the frame, of a main shaft journaled in said frame, and provided with suitable operating means, pairs of wheels each comprising an indicating and an adding wheel revolubly mounted on said shaft, the indicating-wheels each having a notch, and the adding-wheels each having a series of notches, arranged near its periphery, means for operating said pairs of wheels in a forward direction synchronously, a suitable train of mechanism between the indicating-wheels and said shaft for revolving said indicating-wheels in a rearward direction by means of said shaft and thereby resetting said wheels, a reciprocating pawl-frame pivoted near said wheels, pairs of integrally-formed spring-pressed pawls carried by said pawl-frame and adapted to enter the notch on each indicating-wheel and a coincident notch on each adding-wheel, a cam-shaft operatively connected to said main shaft and adapted to reciprocate the pawl-frame when the indicating-wheels are reset, and another series of spring-actuated pawls each adapted to enter one of said notches of their corresponding adding-wheels and thereby prevent backward rotation thereof when its corresponding indicating-wheel is reset, substantially as described.

6. In a cash-register, the combination of a cam and two wheels journaled side by side and spaced by said cam, the one having a series of pins concentrically arranged and the other carrying a pawl provided with a rounded or cam portion at its end wiping on the cam, said cam being adapted to permit intermittent engagement between said pawl and one of the pins, substantially as described.

7. In a cash-register, the combination with the frame, of a tubulure projecting from said frame, a cam secured to the free end of said tubulure, an adding-wheel and a totalizing-wheel, the one journaled in the frame and the other on the tubulure and said wheels being spaced by said cam, pins concentrically arranged on the totalizing-wheel, a spring-actuated pawl carried by the adding-wheel and provided with a rounded or cam portion at its end wiping on the cam, said cam being adapted to permit intermittent engagement between said pawl and one of the pins, and means for actuating the adding-wheel, substantially as described.

In testimony that I claim the foregoing specification I have hereunto set my hand this 26th day of August, 1897.

ALBERT LATHAM.

In presence of—
C. L. MALCOLM,
J. H. BEEL.